United States Patent [19]
Young et al.

[11] Patent Number: 5,941,964
[45] Date of Patent: Aug. 24, 1999

[54] BRIDGE BUFFER MANAGEMENT BY BRIDGE INTERCEPTION OF SYNCHRONIZATION EVENTS

[75] Inventors: Bruce Young, Tigard, Oreg.; Jeff Rabe, Fair Oaks; Stephen Fischer, Rancho Cordova, both of Calif.

[73] Assignee: Intel Corporation, Santa Clara, Calif.

[21] Appl. No.: 08/480,953

[22] Filed: Jun. 7, 1995

Related U.S. Application Data

[63] Continuation of application No. 07/886,962, May 21, 1992, abandoned.

[51] Int. Cl.$^6$ ............................................. G06F 13/00
[52] U.S. Cl. ............................................................ 710/100
[58] Field of Search ................................... 710/100, 108, 710/105

[56] References Cited

U.S. PATENT DOCUMENTS

| | | | |
|---|---|---|---|
| 3,818,461 | 6/1974 | Ward et al. | 340/172.5 |
| 4,965,801 | 10/1990 | DuLac | 371/40.1 |
| 5,075,846 | 12/1991 | Reininger et al. | 364/200 |
| 5,241,630 | 8/1993 | Lattin, Jr. et al. | 395/325 |
| 5,269,005 | 12/1993 | Heil et al. | 395/275 |
| 5,333,276 | 7/1994 | Solari | 395/325 |

*Primary Examiner*—David Y. Eng
*Attorney, Agent, or Firm*—Blakely, Sokoloff, Taylor & Zafman

[57] ABSTRACT

A bus bridge which intercepts synchronization events and selectively flushes data in buffers within the bridge is disclosed. The bridge insures data consistency by actively intercepting synchronization events, including, interrupts, processor accesses of a control status registers, and I/O master accesses of shared memory space. Interrupt signals may be routed through the bridge, which includes a bridge control unit comprised of state machine logic for managing data transfers through the bridge. In response to an interrupt signal from an agent on a bus, the bridge control unit flushes posted data before allowing a processor to process the interrupt signal. The bridge control unit further requires that the bridge complete all posted writes generated from a first bus before the bridge accepts a read generated from a second bus. The bridge control unit additionally insures strict ordering of accesses through the bridge. Data consistency is thereby realized without requiring the bridge to participate in the cache coherency protocol of the primary bus.

17 Claims, 4 Drawing Sheets

BRIDGE BUFFER MANAGEMENT BY BRIDGE INTERCEPTION OF SYNCHRONIZATION EVENTS

This is a continuation of application Ser. No. 07/886,962, filed May 21, 1992 now abandoned.

BACKGROUND OF THE INVENTION

1. Field of the Invention

The present invention relates to the field of buses and bus bridges, and more particularly to a method and apparatus for optimizing the management of buffers within a bus bridge.

2. Art Background

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

The primary task of a bridge is to allow data to cross from one bus to the other bus without diminishing the performance of either bus. To perform this function, the bridge must understand and participate in the bus protocol of each of the buses. In particular, the bridge must be able to serve in both a slave capacity and a master capacity such that it can accept a request from a first bus as a slave, then initiate an appropriate bus operation on the other bus as a master. The bridge must, therefore, provide support for accesses crossing from one bus to the other bus.

Typically, a bridge utilizes data buffering such that data to be transferred through the bridge from either the memory bus or the peripheral bus is temporarily stored, or "posted," within a data buffer. Posting data in a bridge can enhance the performance of the system by packetizing data and pre-fetching data, but can also introduce a problem of data consistency when synchronization events occur. These synchronization events can include interrupts, processor accesses of status registers within agents, or processor accesses of a predetermined address in shared memory space serving as a flag. When a synchronization event occurs, and data remains posted in the bridge, data inconsistency can result.

Certain systems address the issue of data consistency by forcing the bridge to participate in the cache protocol of the memory bus. This solution, however, forces a high level of the complexity onto the bridge and tends to be expensive. As will be described, the present invention addresses the issue of data consistency through a less complex and costly method and apparatus. In particular, the present invention intercepts synchronization events and selectively flushes data buffers within the bridge.

SUMMARY OF THE INVENTION

The present invention finds application in computer systems using a first bus, a second bus, and a bridge with a buffering capability coupling the two buses together. The bridge of the present invention insures data consistency by actively intercepting synchronization events, including interrupts, processor accesses of control status registers, and accesses of shared memory space status flags. In the present invention, interrupts are routed through the bridge itself, which includes a bridge control unit comprised of state machine logic for managing data transfers through the bridge. In response to an interrupt signal from an agent on a bus, the bridge control unit flushes all posted data in bridge buffers prior to allowing the processor to enter a service routine that acts upon the interrupt signal, thereby insuring data consistency.

To insure data consistency in a system utilizing control status registers for synchronization events, the bridge control unit advantageously requires that the bridge complete all pending accesses generated from a first bus before the bridge accepts a read generated from a second bus. Lastly, to insure data consistency in a synchronization event including the accesses of shared memory space, the bridge control unit insures strict ordering of accesses through the bridge. These methods can be utilized separately or in combination. An embodiment is disclosed which utilizes all of the methods of the present invention to insure data consistency.

The bridge of the present invention, therefore, provides for bridge interception of synchronization events and the selective management of bridge buffering in response to these synchronization events. The present invention thus resolves issues of data consistency through hardware in the bridge without requiring the bridge to participate in the cache coherency protocol of the primary bus.

BRIEF DESCRIPTION OF THE DRAWINGS

Further details are explained below with the help of the examples illustrated in the attached drawings in which.

DETAILED DESCRIPTION OF THE INVENTION

A bus method and apparatus for optimizing the management of data within a bus bridge having a buffering capability is described. In the following description, for purposes of explanation, numerous details are set forth such as specific memory sizes, bandwidths, data paths, etc. in order to provide a thorough understanding of the present invention. However, it will be apparent to one skilled in the art that these specific details are not essential to the practice of the present invention. In particular, the present invention can readily be used in conjunction with a wide variety of buses, each bus having its own unique protocol, bandwidth, and data transfer characteristics. It is further noted that well known electrical structures and circuits are shown in block diagram form in a number of figures in order not to obscure the present invention unnecessarily.

Figure 1:
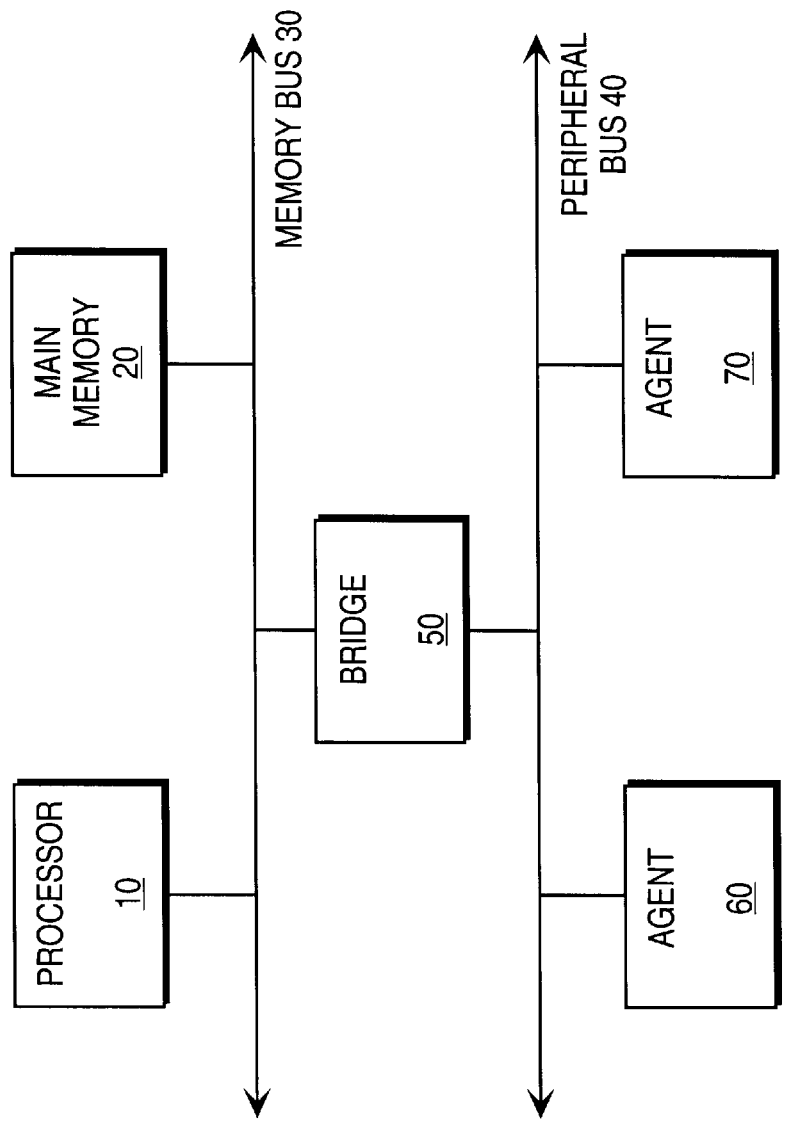
FIG. 1 illustrates a typical computer system having a memory bus and a peripheral bus coupled together using a bus bridge.

Referring now to FIG. 1, a computer system incorporating two buses is illustrated. In this system, a processor 10 and a main memory 20 are coupled to a memory bus 30. Memory bus 30 is advantageously designed for high performance to provide high bandwidth and low latency transfers between the processor 10 and main memory 20. To further enhance the performance of the system, the processor 10 can include a cache memory (not shown), and main memory 20 can store data in cache lines (not shown). A second bus, the peripheral bus 40, serves as a local bus for peripheral devices such as disk drives, network interconnects, or graphics subsystems (collectively referred to as "agents"). Two such peripheral devices, denoted agent 60 and agent 70, are shown in FIG. 1 coupled to peripheral bus 40.

Memory bus 30 and peripheral bus 40 are coupled together through a bus bridge 50. In the system illustrated in FIG. 1, the basic task of the bridge 50 is to couple memory bus 30 and peripheral bus 40 together to provide a mechanism for requests that originate on one of the buses to be passed to a destination on the other bus. To perform this function, the bridge 50 must understand and participate in the bus protocol of each of the buses 30 and 40. In particular, the bridge 50 must be able to serve in both a slave capacity and a master capacity, such that it can accept a request from a first bus as a slave, then initiate an appropriate bus operation on the other bus as a master.

There are three primary operations which the bridge 50 must support. First, the bridge 50 must support accesses from the processor 10, directed to an agent on the peripheral bus 40. These accesses necessarily route data through bridge 50. Second, the bridge 50 must support accesses from an agent on the peripheral bus 40 to a module on the memory bus 30, for example, main memory 20. Again, these accesses necessarily route data through bridge 50. Third, the agents on the peripheral bus 40 frequently need to inform the processor 10 that certain events have occurred, events which are termed interrupts. The bridge 50 must support the channeling of these interrupts to the processor 10. In each of these operations, the bridge 50 must convert data from a first bus protocol to a second bus protocol, and not cause incoherency or deadlock conditions to occur. Ideally, the bridge 50 allows memory bus 30 to operate completely independently of peripheral bus 40. In the event that the processor 10 is required to access an agent on the peripheral bus 40, the processor 10 simply accesses the bridge 50 on memory bus 30. It is then the responsibility of bridge 50 to actively engage peripheral bus 40.

The design of bridge 50 can range from a simple protocol converter, which can be implemented in PAL technology, to a complicated highly tuned device which requires an ASIC or custom design capability. Alternatively, depending on the cost and complexity the designer is willing to incur to provide a specific level of functionality, the design can cover a performance point between these two extremes. A bridge is advantageously designed to include a buffering capability. Buffering allows the bridge to temporarily store or "post" data in order to more efficiently transfer data between the buses.

Figure 2:
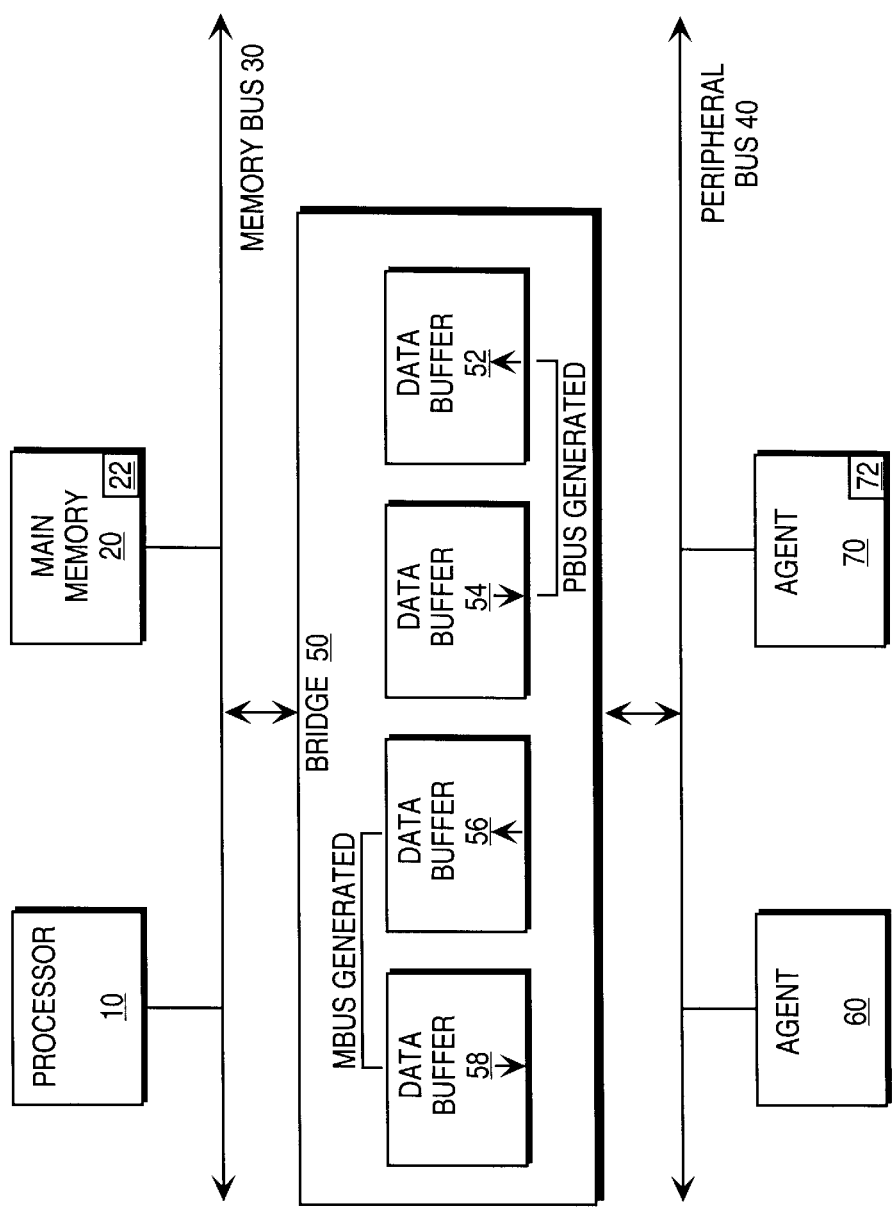
FIG. 2 illustrates this computer system with the addition of buffering within the bus bridge.

Referring now to FIG. 2, this figure illustrates the same system as shown in FIG. 1 with the addition of four data buffers within bridge 50. In particular, as illustrated in this figure, bridge 50 includes data buffer 52, data buffer 54, data buffer 56, and data buffer 58. Data buffers 52 and 54 buffer data in accesses generated from the peripheral bus 40 side of the system, while data buffers 56 and 58 buffer data in accesses generated from the memory bus 30 side of the system. In particular, data buffer 52 is used in write operations originating from the peripheral bus 40 and directed to main memory 20 to advantageously post data until an efficient transfer over memory bus 30 can be accomplished. For example, if agent 60 wishes to write one megabyte of data into main memory 20, rather than transfer this data one byte at a time through bridge 50, across the memory bus 30, into main memory 20, the data can initially be posted in data buffer 52, and thereafter transferred efficiently over memory bus 30.

Accordingly, the use of data buffer 52 entails initially coupling several bytes of data to bridge 50, temporarily storing the data in data buffer 52, with bridge 50 requesting control of memory bus 30 when it is advantageous to do so. Assuming that memory bus 30 is eight bytes wide, the bridge 50 can wait until it accumulates at least eight bytes of data in data buffer 52 before requesting access to memory bus 30. After being granted access, bridge 50 can transfer the data efficiently in an eight byte packet. This process of prepackaging data is referred to as "packetizing," and readily exploits the fact that I/O transfers from agents on the peripheral bus 40 typically take place in contiguous data blocks. Packetizing can thus reduce the amount of wasted bandwidth and minimize disruptions on memory bus 30.

Data buffer 54 is used to buffer data in read operations originating from an agent on the peripheral bus 40 and directed to main memory 20. With a buffering capability, the bridge 50 can respond to such a read operation by assuming that agent 60 ultimately intends to read a series of contiguous bytes from main memory 20. Operating under this assumption, the bridge 50 can then respond to the first read request for one byte by reading from main memory 120 this byte of data, as well as the next seven contiguous bytes. This "pre-fetch" of the next seven contiguous bytes of data takes advantage of the bandwidth of memory bus 30, and in most systems, incurs a minimal additional performance cost. The additional bytes are then stored in data buffer 54. Thereafter, when agent 60, as predicted, requests a read of the next sequential byte of data from main memory 20, this subsequent request can be processed within bridge 50 without the need to disrupt traffic on the memory bus 30. Additionally, this sequential read can be satisfied in fewer clock cycles because the data is stored locally in data buffer 54, thereby reducing latency on the peripheral bus 40.

Data buffers 56 and 58 are similarly used to buffer data in write and read operations originating from a module on the memory bus 30, for example, processor 10, directed to an agent or memory on peripheral bus 40. In particular write data can be posted in data buffer 58, while read data can be pre-fetched in data buffer 56.

Although buffering data in data buffers 52, 54, 56, and 58 can provide substantial performance benefits, certain functional issues arise. In particular, a data consistency problem occurs following synchronization events. In the system illustrated in FIG. 2, synchronization events serve to inform the processor 10 when data transfers have been completed. Three types of synchronization events can occur in a system as shown in FIG. 2.

A first type of synchronization event utilizes a status register in the bus master. This type of synchronization event can be characterized broadly as the status flag and the data buffer being on opposite sides of the bridge. For example, following the final transaction in a write operation from agent 70 to main memory 20, agent 70 sets a bit in a status register 72 within agent 70. This newly written bit in status register 72 indicates that the data transfer is complete. The processor 10 thereafter reads this bit in status register 72, concludes that the data transfer is complete, and proceeds accordingly.

A second type of synchronization event utilizes interrupts. For example, following the final transaction in a write operation from agent 70 to main memory 20, agent 70 directs an interrupt signal to processor 10 directly communicating to the processor 10 that the data transfer is complete, and the processor 10 proceeds accordingly.

A third type of synchronization event utilizes shared memory space serving as a flag. This type of synchronization event can be characterized broadly as the status flag and the data buffer being on the same side of the bridge. For example, following the final transaction in a write operation from agent 70 to main memory 20, agent 70 writes to a predetermined address 22 in main memory 20. The newly written bit in address 22 is in shared memory space and serves as a flag indicating that the data transfer is complete. The processor 10 thereafter reads the flag, concludes that the data transfer is complete, and proceeds accordingly.

The aforementioned data consistency problem occurs if the processor 10 assumes that a data transfer has been completed following a synchronization event, when in actuality, the data remains buffered within bridge 50. Assume, for example, that following a write operation from agent 70 to main memory 20, agent 70 directs an interrupt signal to processor 10. If processor 10 then proceeds to access what it assumes is the newly written data in main memory 20, when in actuality, some or all of the data is still posted in data buffer 52, the processor 10 will improperly access "stale" data. Thus, a bridge design must consider the issue of data consistency. One possible solution to this problem is to have the bridge 50 participate in the cache coherency protocol of memory bus 30. This solution, however, forces a high level of the complexity onto the bridge 50 and tends to be expensive. A second possible solution is to frequently and regularly flush data buffers 52, 54, 56, and 58. This solution, however, compromises overall system performance.

As will be described, the present invention addresses the problem of data consistency through bridge intercepts of synchronization events and selective flushing of buffered data. In the description which follows, it will be appreciated that the present invention includes a number of separate methods, each method advantageously used in response to a particular type of synchronization event. These methods of operation can be used separately, or in combination, depending upon the number and variety of synchronization events used by a particular system.

Figure 3:
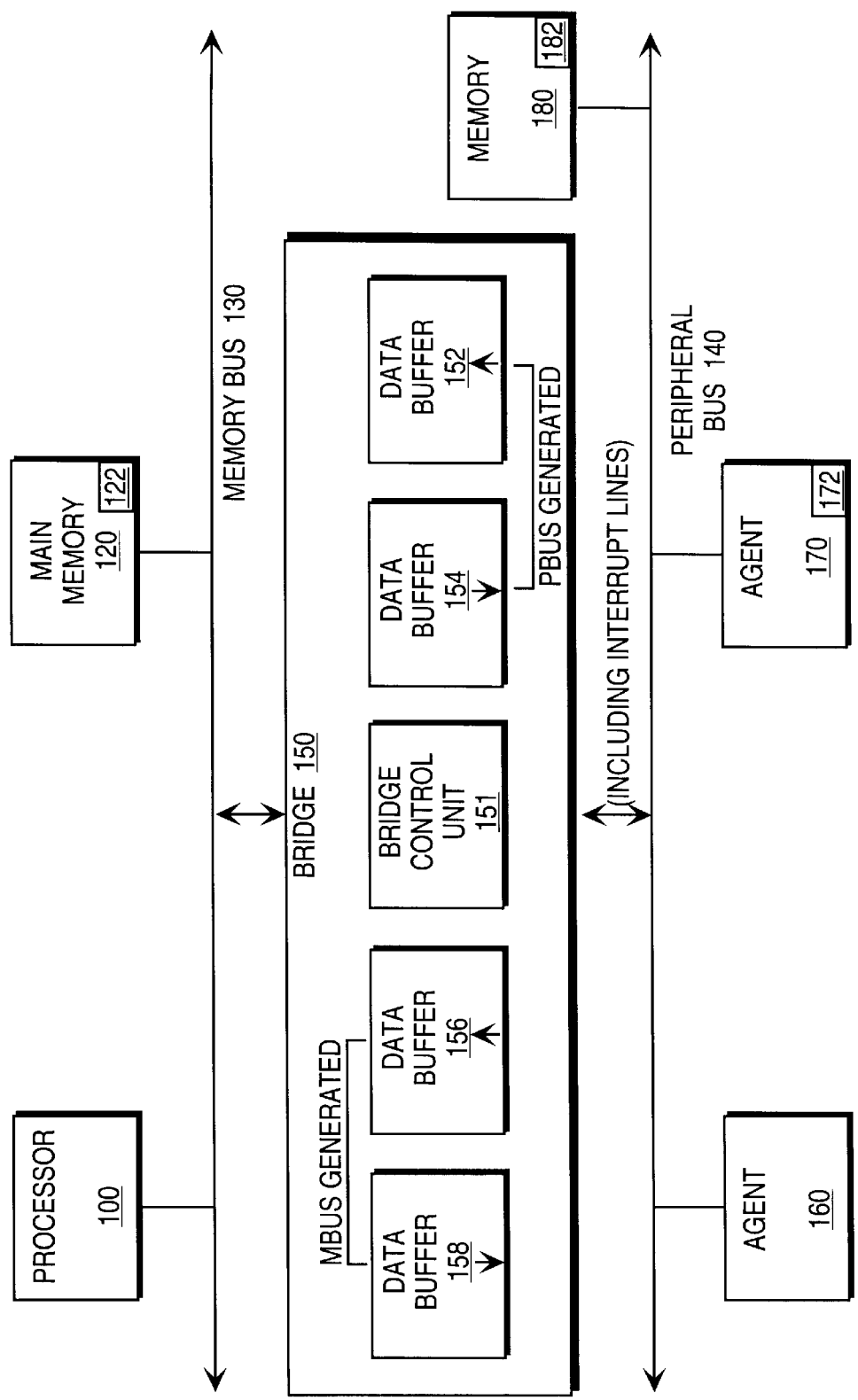
FIG. 3 illustrates a first embodiment of a bus bridge which operates in accordance with the present invention.

Referring now to FIG. 3, a bridge which operates in accordance with the present invention is illustrated. As shown in this figure, a processor 100 and a main memory 120 are coupled to a memory bus 130. A second bus, peripheral bus 140, serves as a local bus for peripheral devices such as disk drives, network interconnects, or graphics subsystems. Two such agents, agent 160 and agent 170 are shown coupled to peripheral bus 140.

Memory bus 130 and peripheral bus 140 are coupled together through a bus bridge 150. Bridge 150 includes four data buffers. In particular, as illustrated in this figure, bridge 150 includes data buffer 152, data buffer 154, data buffer 156, and data buffer 158. Data buffers 152 and 154 buffer data in accesses generated from the peripheral bus 140 side of the system, while data buffers 156 and 158 buffer data in accesses generated from the memory bus 130 side of the system.

Bridge 150 further includes a bridge control unit 151 which controls the functioning of bridge 150. Bridge control unit 151 comprises state machine control logic which serves to control the functioning of the bridge 150 in response to commands from the memory bus 130 or the peripheral bus 140. Bridge control unit 151 determines whether, and when bridge 150 will arbitrate for control of a particular bus. Bridge control unit 151, therefore, includes protocol control units for memory bus 130 and peripheral bus 140, and control logic for managing the buffering of data within the bridge 150.

The bridge control unit 151 in the present invention actively intercepts synchronization events. With respect to the first type of synchronization event which involves the access of a control status register in a bus master on peripheral bus 140, bridge control unit 151 requires the completion of all writes generated from a first bus before it accepts a read generated from a second bus. Thus, in response to an access generated from the memory bus 130 directed to the peripheral bus 140, the following occurs. If the bridge 150 presently has data posted in it associated with accesses generated by the peripheral bus 140, the bridge control unit 151 intercepts the new access generated by memory bus 130, issues a "back-off" or retry order for the new access, flushes all bridge buffers containing data associated with accesses generated by the peripheral bus 140, then accepts the new access from the memory bus 130. This method of operation can be understood in greater detail through the following example.

Assume that agent 170 is writing data to main memory 120. In accordance with the first type of synchronization event, following the final transaction, agent 170 will set a bit in its status register 172. When the processor 100 attempts to access the status register 172 to confirm the completion of the data transfer, as previously discussed, data buffer 152 may still have data posted in it. In the present invention, until data buffer 152 is empty, the bridge control unit 151, intercepts all reads from the processor 100 directed to the peripheral bus 140. Thus, if data buffer 152 is not empty when the processor 100 couples the read access of status register 172 to bridge 150, the bridge control unit 151 responds by issuing a back-off or retry order to the processor 100. Following this issuance, the bridge control unit 151 flushes data buffer 152. Once the data is flushed from data buffer 152, the bridge control unit 151 accepts the read access from processor 100. Thus, the synchronization event is completed only when data consistency can be insured by flushing data buffer 152. It will be appreciated that this method requires that the memory bus 130 have retry semantics.

This method can be distilled into the following rule of operation incorporated into bridge control unit 151. Data can reside in either the write posting buffers 158 and 152 or one of the read buffers 154 or 156, but not both. This rule of operation underscores the fact that the previously described method of operation applies with equal force to a write operation from the processor 10, for example, to peripheral memory 180 wherein data is posted in data buffer 158, and agent 170 seeks to read a flag 122 in main memory 120.

In an alternative method to that just described for the first type of synchronization event, following a write operation from agent 170 to main memory 120, the bridge control unit 151 intercepts all accesses from the processor 100 specifically directed to status register 172 until data buffer 152 is empty. Thus, the bridge control unit 151 can particularize and limit its intercepts to those accesses from the processor 100 which might cause data consistency problems. Assuming that data buffer 152 is not empty, bridge control unit 151 responds to an access of status register 172 by issuing a "back-off" or retry order to the processor 100. Following this issuance, the bridge control unit 151 flushes all data in data buffer 152 associated with the write operation from agent 170, thereby transferring this data into the target of the write operation, main memory 120. The flushing of data from data buffer 152 can, thus, be particularized to that data which, if not flushed, will cause data consistency problems. Following this particularized flushing of data buffer 152, the bridge control unit 151 accepts the access to the status register 172, and the synchronization event is completed. It will be appreciated that this alternative method also requires that the memory bus 130 have retry semantics.

With reference to the second type of synchronization event using interrupts, in the present invention, interrupt request lines from the peripheral bus 130 may be routed through the bridge 150. As with the first type of synchronization event, the bridge 150 also intercepts these synchronization events. According to the method of the present invention, in response to an interrupt signal from a particular agent on peripheral bus 140, the bridge control unit 151 insures that prior to the processor 100 processing this interrupt signal, the data buffer which contains data associated with this agent is flushed. In an alternative method, in response to an interrupt signal, all data buffers 152, 154, 156, and 158 are flushed.

Preventing the processor 100 from processing the interrupt can be accomplished through at least two different methods. In a first method, the bridge control unit 151 posts the interrupt signal by delaying its delivery to the processor 100 until it flushes the buffer or buffers. In a second method, the bridge control unit 151 may not have access to the interrupt signal directly, but can prevent an interrupt acknowledge cycle from completing by using "back-off" or retry until it flushes the buffer or buffers. With the second method, the interrupt signals are not required to pass through the bridge 150. The decision as to which of these methods to use depends upon the interrupt methodology used by the system.

With respect to the third type of synchronization event involving processor accesses of shared memory space flags, the present invention additionally operates the bridge 150 with strict ordering of accesses. All accesses originating on one bus targeted at the other bus will occur in the same order on the other bus. As described, the third type of synchronization event includes an agent writing data to main memory 120 followed by writing a flag to predetermined address 122 in main memory 120. The newly written bit in address 122 serves as a flag, and is thereafter read by the processor 100.

Continuing to refer to FIG. 3, another possible scenario in which this synchronization event might arise can be understood through reference to this figure. In a first scenario, an access through bridge 150 is directed from an agent on a first bus to a memory location which is on a second bus with the shared memory space on the second bus. This would correspond, for example, to a write operation from agent 170 to main memory 120, with the location of the flag in predetermined address 122. In this scenario, bridge control unit 151 maintains strict ordering of accesses to insure data consistency. Strict ordering requires that the ordering of accesses which are coupled to bridge 150 from a first bus be preserved when the bridge 150 couples these accesses to a second bus. For example, if agent 170 directs a series of write operations A, B, C, and D to main memory, with D being directed to the flag address 122 to indicate to the processor 100 that the transfer has been completed, it will be appreciated that these accesses are initially coupled in the order of A, B, C, and D to bridge 150. In the present invention, when bridge 150 under the control of bridge control unit 151 couples these accesses to memory bus 130 and main memory 120, it maintains the strict ordering A, B, C, and D, and thereby insures data consistency.

Additional scenarios can be envisioned which do not present data consistency issues. Briefly, in a third scenario, an access from an agent on a first bus is directed to a memory location on the first bus, with the shared memory location on a second bus. This would correspond, for example, to a write operation from agent 170 to peripheral memory 180, with the location of the flag in predetermined address 122. This scenario, which simply routes the final write operation through bridge 150, does not present a data consistency issue. In a fourth scenario, an access from an agent on a first bus is directed to a memory location on the first bus, with the shared memory location on the first bus. This would correspond to a write operation from agent 170 to peripheral memory 180 with the location of the flag in predetermined address 182. With strict ordering of operations on the first bus, no issue of data consistency arises. Thus, to resolve data consistency problems associated with the third type of synchronization event, the present invention insures strict ordering of accesses through the bridge 150.

It should be noted that while the preceding description has focused on three types of synchronization events, there does exist, in some systems, a fourth type of synchronization event. This synchronization event simply waits a specified amount of time after a final transaction, after which time, the system assumes the data transfer is complete. Because of differing processor speeds, systems must implement a special mode to allow these timing loops to be consistent between machines. This is often referred to as "De-Turbo" mode. In the present invention, when, and if the system enters this mode, the bridge control unit 151 does not post data and both busses run without concurrency.

Figure 4:
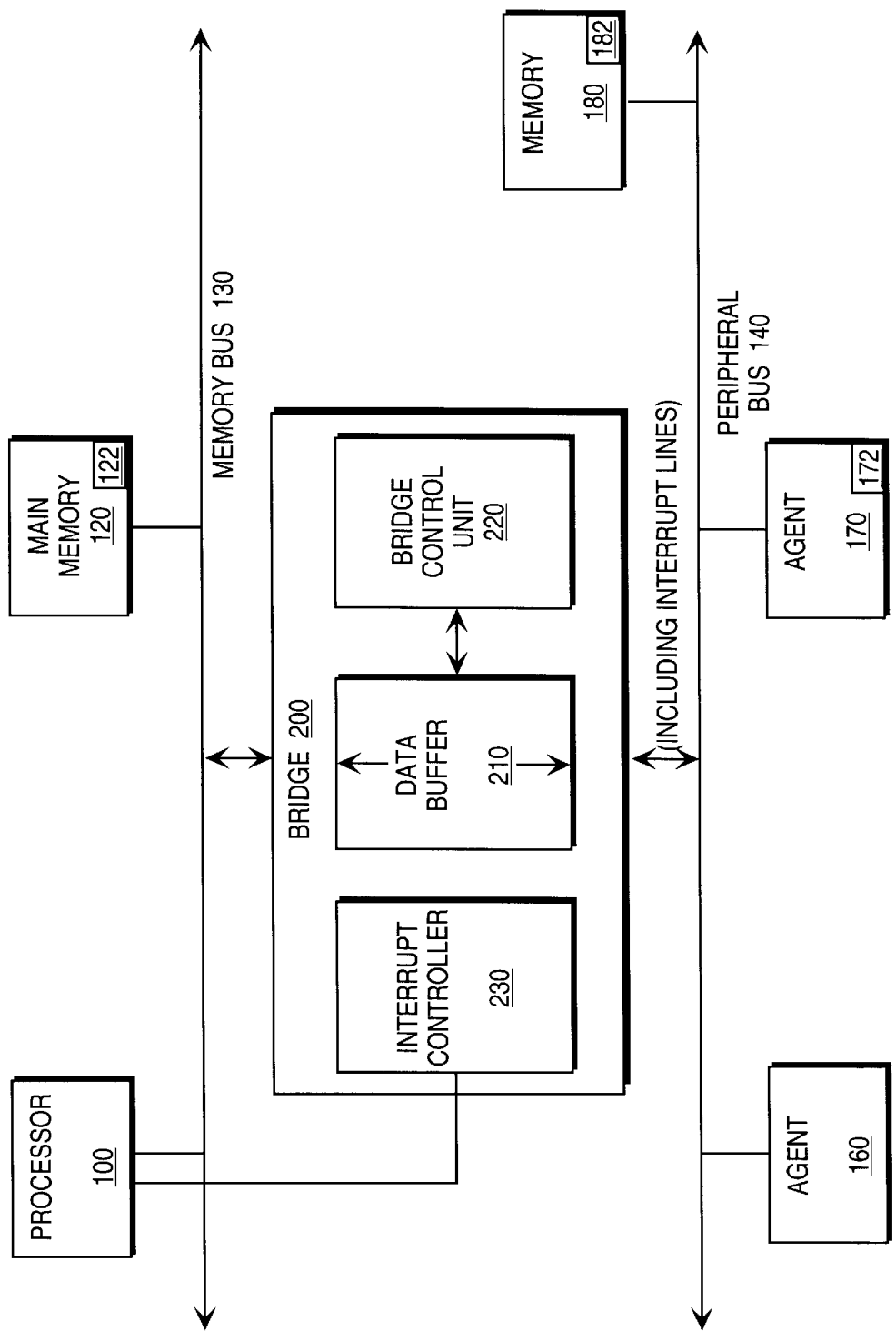
FIG. 4 illustrates a second embodiment of a bus bridge which operates in accordance with the present invention.

Referring now to FIG. 4, a second embodiment of a bus bridge 200 which operates in accordance with the methods of the present invention is illustrated. In this embodiment, bus bridge 200 includes a single, bi-directional data buffer 210, a bridge control unit 220, and an internal, interrupt controller 230. (The interrupt controller 230 can alternatively reside outside of bridge 200.) Bridge control unit 220 comprises state machine control logic which serves to control the functioning of the bridge 200 in response to commands from the memory bus 130 or the peripheral bus 140. Bridge control unit 220 determines whether, and when bridge 200 will arbitrate for control of a particular bus. Bridge control unit 220, therefore, includes protocol control units for memory bus 130 and peripheral bus 140 and control logic for managing the buffering of data within the bridge 200, in particular, the buffering of data within bi-directional data buffer 210.

Bridge control unit 220 manages bi-directional data buffer 210 according to all the aforementioned prescribed methods of operation. Accordingly, strict ordering of accesses through the bridge 200 is maintained by the bridge control unit 220. In particular, if four accesses A, B, C, and D directed to the memory bus 130 are coupled to bridge 200 from peripheral bus 140, those four accesses must be mirrored in the order A, B, C and D, on memory bus 130.

In addition, bridge control unit 220 requires the completion of all accesses generated from a first bus before it accepts an access generated from a second bus. Thus, in response to an access generated from the memory bus 130 directed to the peripheral bus 140, the following occurs. If the bridge 150 presently has data posted in data buffer 210 associated with accesses generated by the peripheral bus 140, the bridge control unit 220 intercepts the new access generated by memory bus 130, issues a retry order for this access, flushes all data in data buffer 210 associated with the accesses generated by peripheral bus 140, then accepts the new access from the memory bus 130. Data thus cannot simultaneously reside in the bi-directional data buffer 210 from accesses generated from different buses.

Interrupt lines are routed through the bridge 200. In response to an interrupt signal from a particular agent on peripheral bus 140, the bridge control unit 220 insures that prior to the processor 100 processing this interrupt signal, bi-directional data buffer 210 is flushed. Preventing the processor 100 from processing the interrupt can be accomplished by the bridge control unit 220 pending the interrupt signal until bi-directional data buffer 210 is flushed, or the bridge control unit 220 coupling the interrupt signal to an interrupt controller 230, and thereafter, preventing an interrupt acknowledge cycle from occurring through a "back-off" or retry mechanism until it flushes bi-directional data buffer 210. As previously described, should the system enter "De-Turbo" mode, bridge control unit 220 would not post data in bi-directional data buffer 210.

Thus, the bus bridge of the present invention provides for the interception of synchronization events in a bus bridge. More particularly, the method of the present invention provides for the interception of synchronization events and the selective management of bridge buffering in response to synchronization events. The present invention thereby resolves issues of data consistency through hardware logic implementation within a bridge, without requiring the bridge to participate in the cache coherency protocol of the memory bus.

While the present invention has been particularly described with reference to FIGS. 1 through 4, and with emphasis on certain buses and bandwidths, it should be understood that the figures are for illustration only and should not be taken as limitations upon the invention. In addition, the use of the term "peripheral bus" should not be taken as a limitation on the type of bus to which the present invention can be applied. The present invention finds application in a wide variety of buses. It is further contemplated that many changes and modifications may be made to the invention, by one of ordinary skill in the art, without departing from the spirit and scope of the invention as disclosed herein.

We claim:

1. A computer system comprising:
    a first bus;
    a processor coupled to said first bus;
    a memory coupled to said first bus;
    a second bus;
    at least one agent coupled to said second bus;
    a bus bridge coupled to said first bus and said second bus to facilitate transfers of data among said processor, memory and at least one agent, via said first and second buses, said bus bridge including at least one data buffer to buffer said data being transferred, and bridge control logic to control the transfer of data between said buses, wherein said bridge control logic includes logic to identify, intercept, and handle a plurality of different types of synchronization events in a manner that ensures consistency of said data being transferred in said buffered manner are unaffected by the handling of said intercepted synchronization events, which includes synchronization events that are independent of the data being transferred.

2. The computer system as provided in claim 1, wherein said bridge control logic further includes
    logic to identify, as a first type of the plurality of different types of synchronization events, a read request from said processor which is to be transferred, via said first and second buses and said bus bridge, to one of said at least one agent,
    logic to intercept said read request, and
    logic to flush data buffered in said at least one data buffer associated with a data transfer that is independent of said intercepted read request.

3. The computer system as provided in claim 2, wherein said bridge control logic further includes
    logic to identify, as a second type of the plurality of different types of synchronization events, an interrupt signal from said at least one agent, said interrupt signal directed to said processor,
    logic to intercept said interrupt signal, and
    logic to flush data buffered in said at least one data buffer associated with a data transfer independent of said intercepted interrupt signal.

4. The computer system as provided in claim 3, wherein said bridge control logic includes logic to maintain a strict ordering of data transfers through said bus bridge.

5. The computer system as provided in claim 2, wherein said bus bridge further includes logic to check whether the read request is directed to a particular register of the at least one agent, and wherein the logic to flush data comprises logic to flush said buffered data in response to intercepting the read request from the processor directed to the particular register.

6. In a computer system having a processor and a memory coupled to a first bus, an agent coupled to a second bus, and said first bus coupled to said second bus through a bus bridge having a data buffer, a method for managing data transfers among said processor, said memory and said agent, via said first and second buses, said method comprising:
    buffering data of said data transfers in said data buffer;
    identifying a plurality of different types of synchronization events, including synchronization events independent of said data being buffered; and
    intercepting and handling said plurality of different types of synchronization events in a manner that ensures consistency of said data being transferred in said buffered manner are unaffected by the handling of said intercepted synchronization events.

7. The method as provided in claim 6, wherein:
    said identifying includes identifying, as a first type of the plurality of different types of synchronization events, a read request from said processor that is independent of said data buffered;
    said intercepting includes intercepting said read request; and
    said handling of the intecepted synchronization events includes flushing said data buffer in response to the intercepting of said read request.

8. The method as provided in claim 6, further comprising preserving a strict ordering of data transfers through said bus bridge.

9. The method as provided in claim 7, wherein:
    said identifying further includes identifying, as a second type of the plurality of different types of synchronization events, an interrupt signal from said agent that is independent of said data being transferred;
    said intercepting further includes intercepting said interrupt signal; and
    said handling of the intercepted synchronization events further includes flushing said data buffer in response to said intercepting of said interrupt signal.

10. The method as provided in claim 9, further comprising preventing said processor from processing said interrupt signal in response to said intercepting of said interrupt signal, until said data buffer is flushed.

11. The method as provided in claim 7, further comprising checking whether the read request is directed to a particular register of the agent coupled to the second bus, and wherein the flushing of said data buffer comprises flushing said data buffer in response to intercepting the read request directed to the particular register.

12. A computer system comprising:

a first bus;

a second bus;

a bus bridge coupled to the first bus and the second bus to facilitate data transfer among components coupled to said buses;

a first of said components coupled to the first bus for initiating a first type of data transfer, wherein the first type of data transfer is directed from the first bus to the second bus via the bus bridge;

a second of said components coupled to the second bus for initiating a second type of data transfer, wherein the second type of data transfer is directed from the second bus to the first bus via the bus bridge; and wherein the bus bridge buffers data associated with both the first type of data transfer and the second type of data transfer, the bus bridge being further operative to identify, intercept, and handle a plurality of different types of synchronization events in a manner that ensures consistency of said data being transferred in said buffered manner are unaffected by the handling of said synchronization events, which includes synchronization events that are independent of the data being buffered.

13. The computer system of claim 12, wherein the first type of data transfer includes read and write operations of components coupled to the second bus initiated by the first component.

14. The computer system of claim 13, wherein the second type of data transfer includes read and write operations of components coupled to the first bus initiated by the second component.

15. The computer system of claim 12, wherein the second of said components requests the second type of data transfer, and said bus bridge control logic further issuing a retry order to the second component in response to intercepting the request.

16. The computer system of claim 12, wherein the second component requests the second type of data transfer to read a portion of the first component.

17. A computer system comprising:

a first bus;

a processor coupled to the first bus;

system memory coupled to the first bus;

a second bus;

a bus bridge coupled between the first bus and the second bus to facilitate data transfers among said processor, system memory and an agent said buses; and said agent, coupled to the second bus, said agent being operative to perform a write transaction to the system memory wherein the agent initially transfers data to the bus bridge and the bus bridge subsequently writes the data to the system memory, the agent including a status register to which the agent writes a value indicating completion of the write transaction after transferring the data to the bus bridge, wherein the bus bridge comprises:

a data buffer that stores the data of the write transaction; and a control circuit coupled to the data buffer and the first bus for identifying, intercepting, and handling a plurality of different types of synchronization events in a manner that ensure consistency of said data of the write transaction is unaffected by the handling of the synchonization events, which includes synchronization events that are independent of the data being buffered.

* * * * *